US012607253B2

(12) United States Patent
Hirota et al.

(10) Patent No.: US 12,607,253 B2
(45) Date of Patent: Apr. 21, 2026

(54) POWER TRANSMISSION DEVICE FOR VEHICLE

(71) Applicant: GKN Automotive Limited, Birmingham (GB)

(72) Inventors: Isao Hirota, Tochigi (JP); Yousuke Kawai, Tochigi (JP); Toru Funane, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/976,418

(22) Filed: Dec. 11, 2024

(65) Prior Publication Data

US 2025/0102051 A1     Mar. 27, 2025

Related U.S. Application Data

(63) Continuation of application No. PCT/JP2022/041442, filed on Nov. 7, 2022.

(51) Int. Cl.
*F16H 48/22*          (2006.01)
*F16H 48/08*          (2006.01)
*F16H 48/40*          (2012.01)

(52) U.S. Cl.
CPC ............. *F16H 48/22* (2013.01); *F16H 48/08* (2013.01); *F16H 48/40* (2013.01); *F16H 2048/082* (2013.01); *F16H 2048/087* (2013.01)

(58) Field of Classification Search
CPC .... F16H 48/22; F16H 48/08; F16H 2048/282; F16H 48/40; F16H 48/24
See application file for complete search history.

(56) References Cited

U.S. PATENT DOCUMENTS 8,382,633 B2 *   2/2013   Cooper ................... F16H 48/30
                                                  475/241
9,752,668 B2 *   9/2017   Okazaki ................. F16H 48/22
                (Continued)

FOREIGN PATENT DOCUMENTS

JP          2013044337 A      3/2013
WO     WO-2017042882 A1 *   3/2017
                (Continued)

OTHER PUBLICATIONS

Written Opinion & International Search Report for PCT/JP2022/041442 dated Jan. 10, 2023, (8 pages).
                (Continued)

*Primary Examiner* — Derek D Knight
(74) *Attorney, Agent, or Firm* — Reising Ethington P.C.

(57)               ABSTRACT

A power transmission device is provided with a casing drivingly coupled to the power source to create a rotation about an axis, and a differential gear set supported by the casing to rotate with the casing about the axis. The differential gear set includes a pair of side gears capable of making a differential motion from each other, a friction section interposed between the casing and the differential gear set, or internal to the differential gear set, to frictionally limit the differential motion, a disconnect device coupled to one of output shafts for connectably disconnecting one of the side gears from the one of the output shafts, and a cam structure coupled directly or indirectly to the friction section to convert a torque in a direction for accelerating the rotation into a thrust force in an axial direction to exert the thrust force on the friction section.

6 Claims, 10 Drawing Sheets

(56)                              References Cited

U.S. PATENT DOCUMENTS

2019/0056018  A1       2/2019  Inose
2021/0293316  A1*      9/2021  Hirota ..................... F16H 48/34

FOREIGN PATENT DOCUMENTS

WO      WO2017208385  A1     12/2017
WO      WO2020129400  A1      6/2020

OTHER PUBLICATIONS

English Translation - International Search Report for PCT/JP2022/
041442 dated Jan. 10, 2023, (2 pages).

* cited by examiner

POWER TRANSMISSION DEVICE FOR VEHICLE

CROSS REFERENCE TO RELATED APPLICATIONS

This application is a continuation Application of PCT International Application No. PCT/JP2022/041442 filed on Nov. 7, 2022, the entire contents of which are incorporated herein by reference.

TECHNICAL FIELD

The disclosure herein relates to a power transmission device which may be applicable to a powertrain of an electric vehicle.

BACKGROUND

In an electric vehicle using an electric motor as its power source, for example, a reduction gear with two or more stages is combined with the motor to compensate its torque shortage. Increasing the reduction ratio allows use of a smaller capacity motor.

The motor is not only used for power output but also works as a generator to regenerate energy when the vehicle is decelerating. Although a motor with a sufficiently large capacity can absorb all the excess energy at a time of deceleration, overload often occurs to a motor with a small capacity. Thus such a vehicle requires any means for protecting its motor, its regeneration circuit or its rechargeable battery.

Japanese Patent Application Publication 2013-044337 discloses a related art.

SUMMARY

The device disclosed hereinafter enables energy regeneration with small loss and prevention of negative effects on an electric motor by optionally intermitting torque transmission.

According to an aspect, a power transmission device for outputting power of a power source to a pair of output shafts with allowing differential rotation, is provided with: a casing drivingly coupled to the power source to create a rotation about an axis; a differential gear set so supported by the casing as to rotate with the casing about the axis, the differential gear set including a pair of side gears capable of making a differential motion from each other; a friction section interposed between the casing and the differential gear set, or internal to the differential gear set, to frictionally limit the differential motion; a disconnect device coupled to one of the output shafts, the disconnect device being configured to connectably disconnect one of the side gears from the one of the output shafts; and a cam structure so coupled directly or indirectly to the friction section as to convert a torque in a direction for accelerating the rotation into a thrust force in an axial direction to exert the thrust force on the friction section.

BRIEF DESCRIPTION OF THE DRAWINGS

The following detailed description of certain embodiments and best mode will be set forth with reference to the accompanying drawings, in which.

DETAILED DESCRIPTION

Exemplary embodiments will be described hereinafter with reference to the appended drawings. Throughout the following description and the appended claims, unless otherwise described, an axis means a rotation axis of a differential device, an axial direction means a direction parallel thereto and a radial direction means a direction perpendicular thereto. The distinction between front, rear, right and left are based on a state where a device at issue is installed in a vehicle, whereas any embodiments would be of course possible where front and rear, or right and left, were arbitrarily interchanged. Drawings are not necessarily made to scale and therefore it is particularly noted that dimensional relations are not limited to those drawn therein.

While a power transmission device according to the present embodiment is applicable to any type of vehicle, it may be applied to a powertrain of an electric vehicle in particular, which can regenerate and turn back energy to a rechargeable battery. The electric vehicle here is not limited to a pure electric vehicle but may be a so-called (plug-in) hybrid vehicle in which a rechargeable battery is used in combination with an internal combustion engine, or a hybrid fuel cell vehicle in which a fuel cell is used in combination with a rechargeable battery.

Figure 1A:
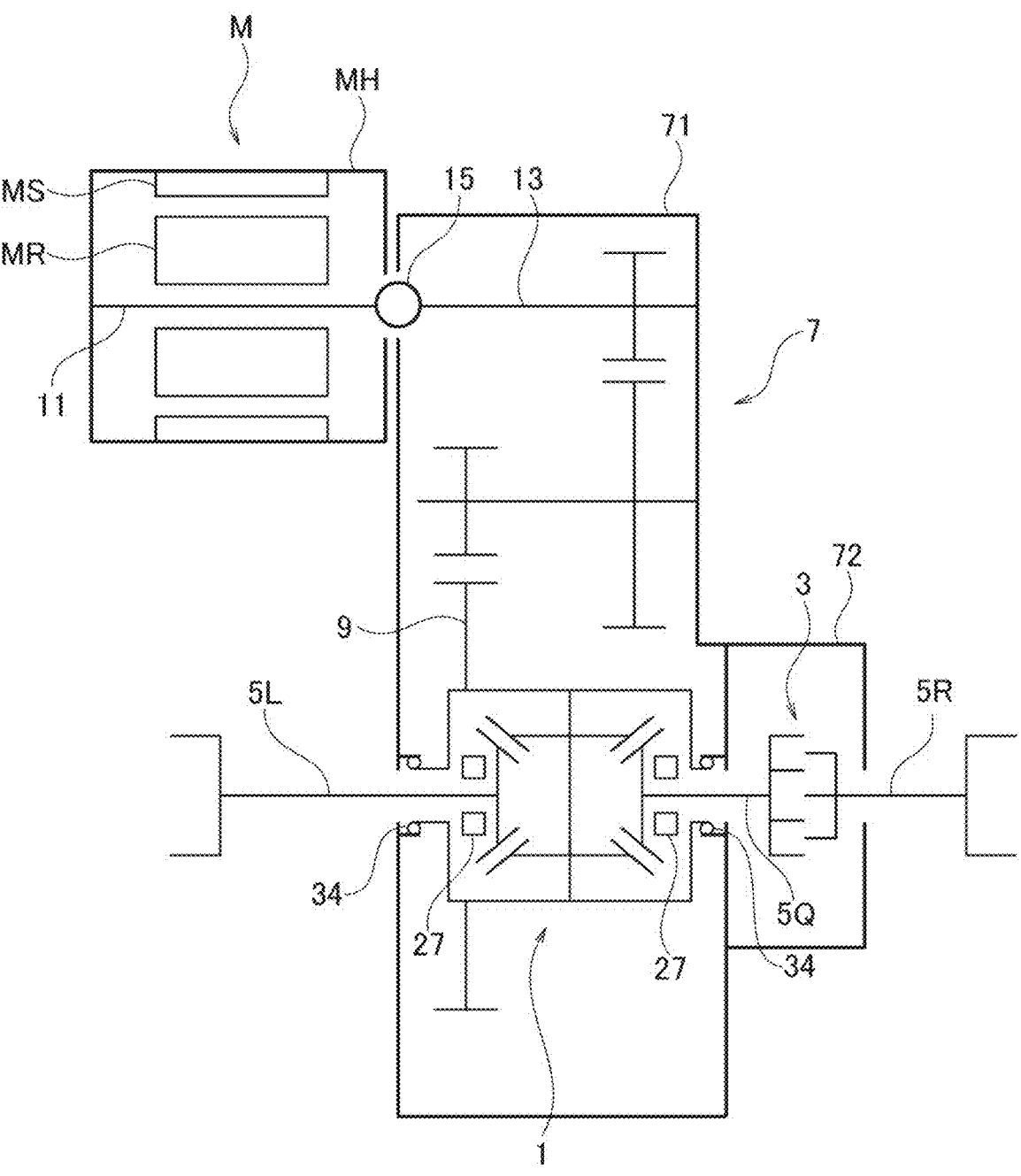
FIG. 1A is a schematic drawing showing a powertrain of an electric vehicle based on an example, in which multi-stage parallel gear train is used as a reduction gear set.

Referring to FIG. 1A for example, a powertrain of an electric vehicle is for example provided with an electric motor M as a power source, a reduction gear set 7 for reducing speed of a rotation (thus, multiplying its force), and a differential device 1 for outputting torque with allowing differential motion. The whole is housed in and supported by a housing.

The motor M is, although not necessarily limited to, provided with a stator MS fixed to a motor housing MH and a rotor MR coupled to and rotating with a shaft 11. In response to a high-frequency current applied by an electric power supply, the rotor MR generates torque relative to the stator MS and outputs the generated torque to the shaft 11.

While the shaft 11 may be led out of the motor housing MH and directly serve as an input shaft of the reduction gear set 7, a coupling 15 may be interposed between the shaft 11 and an input shaft 13. The drivetrain including the reduction gear set 7 and the differential device 1 is housed in and supported by a gear housing 71 defining a chamber separated from a chamber of the motor housing MH. This structure helps to prevent high-frequency noise leakage because it electrically separates the motor M from the drivetrain. The gear housing 71 may be formed in a unitary body with the motor housing MH, because the unitization helps weight reduction of the device as a whole, whereas these housings may be separate bodies alternatively.

In any case, the reduction gear set 7 is provided with one or plural stages of reduction gears and, with reducing the speed of the inputted rotation and in turn multiplying its torque, transmits the multiplied torque to the differential device 1. The differential device 1, by means of a ring gear 9 for example, meshes with the reduction gear set 7 and receives the torque, and further outputs the torque to a right axle 5R and a left axle 5L while allowing differential motion therebetween.

The reduction gear set 7 may be formed of two or more parallel shafts as shown in FIG. 1A. In this case, the differential device 1 belongs to a third or fourth axis in the drivetrain. This structure helps to reduce the axial size of a powertrain or the drivetrain. It further provides freedom of design as respective elements in the power transmission device can be arranged without interference from the motor M.

Figure 1B:
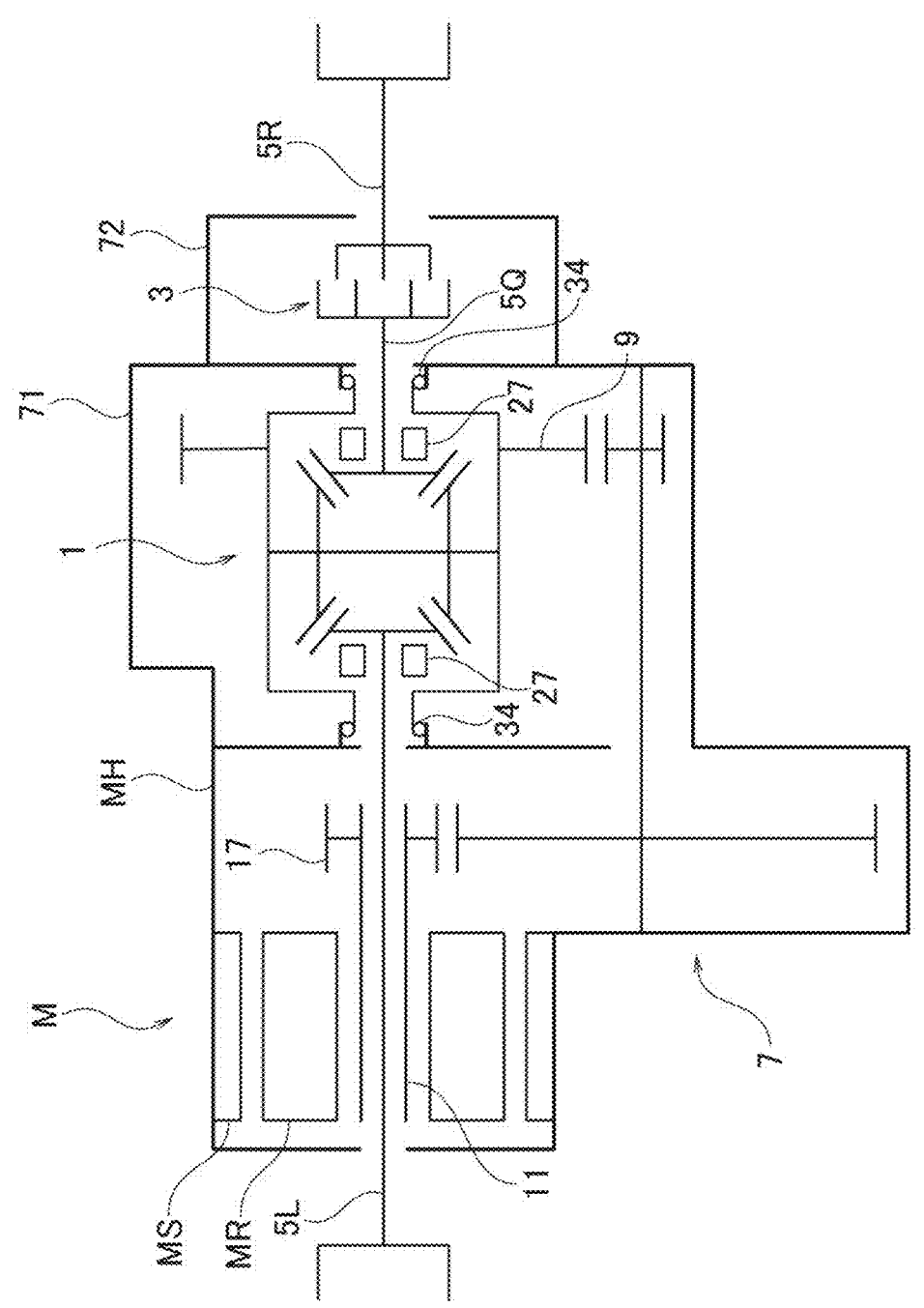
FIG. 1B is a schematic drawing showing a powertrain of an electric vehicle based on another example, in which a power source and a differential are disposed coaxial.

The arrangement illustrated in FIG. 1A, however, requires a considerable room in the radial direction. The arrangement illustrated in FIG. 1B is instead effective for reducing the radial size. In this example, the motor M and the differential device 1 are adjacent to each other in the axial direction and also coaxial, and the shaft 11 of the motor M is hollow and the left axle 5L (or the right axle 5R instead) passes through the shaft 11 to the exterior. The reduction gear set 7 is on a single axis parallel to these shafts but nonetheless achieves sufficient speed reduction as it has doubled reduction gears as with the example shown in FIG. 1A.

Figure 1C:
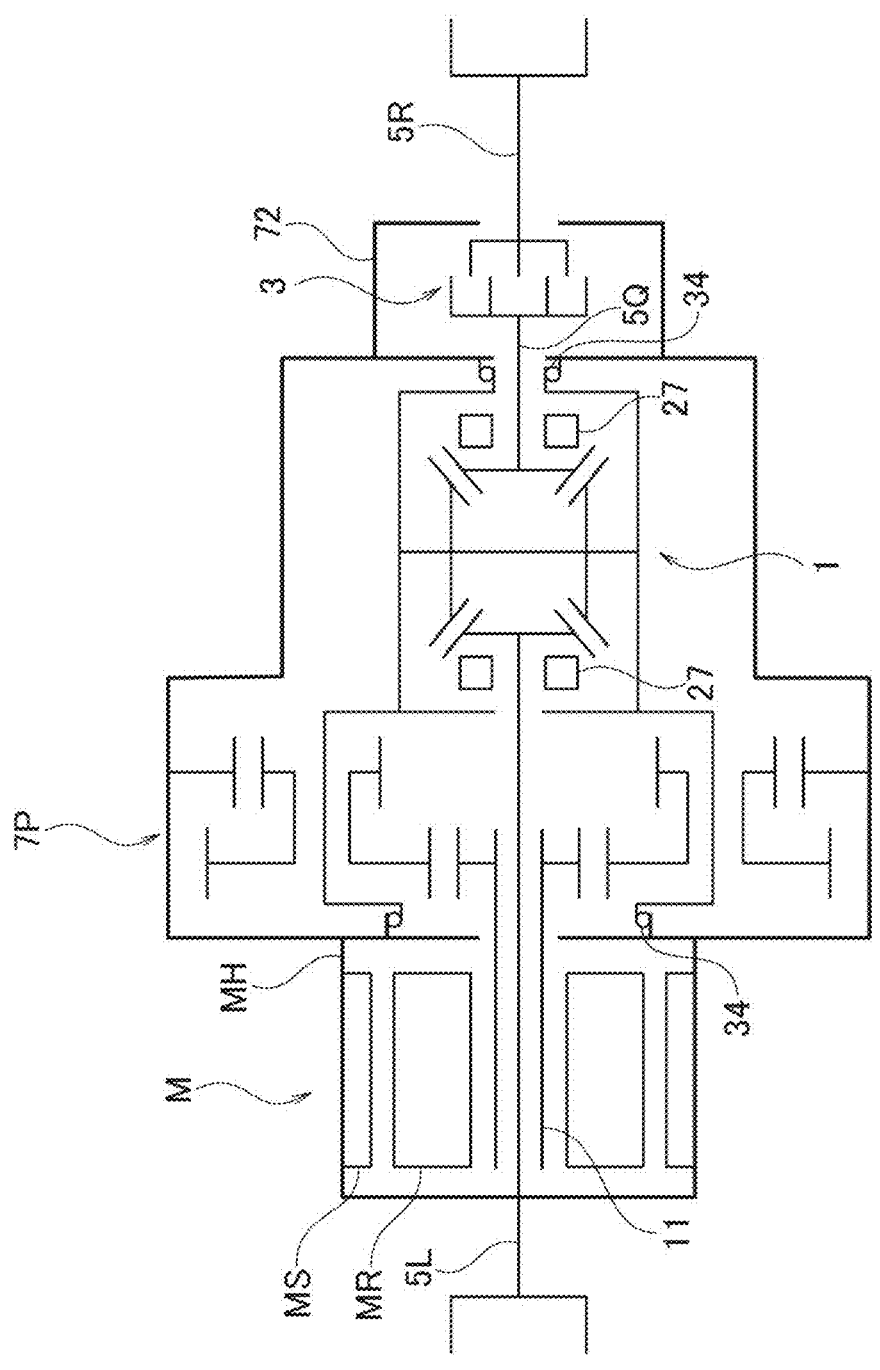
FIG. 1C is a schematic drawing showing a powertrain of an electric vehicle based on yet another example using a planetary gear.

Alternatively, a drivetrain with a planetary gear 7P is possible as shown in FIG. 1C. In the example shown therein, the outer gear is fixed to the gear housing, the sun gear is fixed to the input shaft, and the planetary carrier is coupled to the differential case of the differential device 1, thereby providing a large reduction ratio in torque transmission from the input shaft to the differential device 1. Of course, instead applicable is any other construction, such as using the outer gear for receiving input for example. As will be readily understood from FIG. 1C, use of the planetary gear does not require any large gear expanding radially outward as with FIG. 1B.

Figure 2:
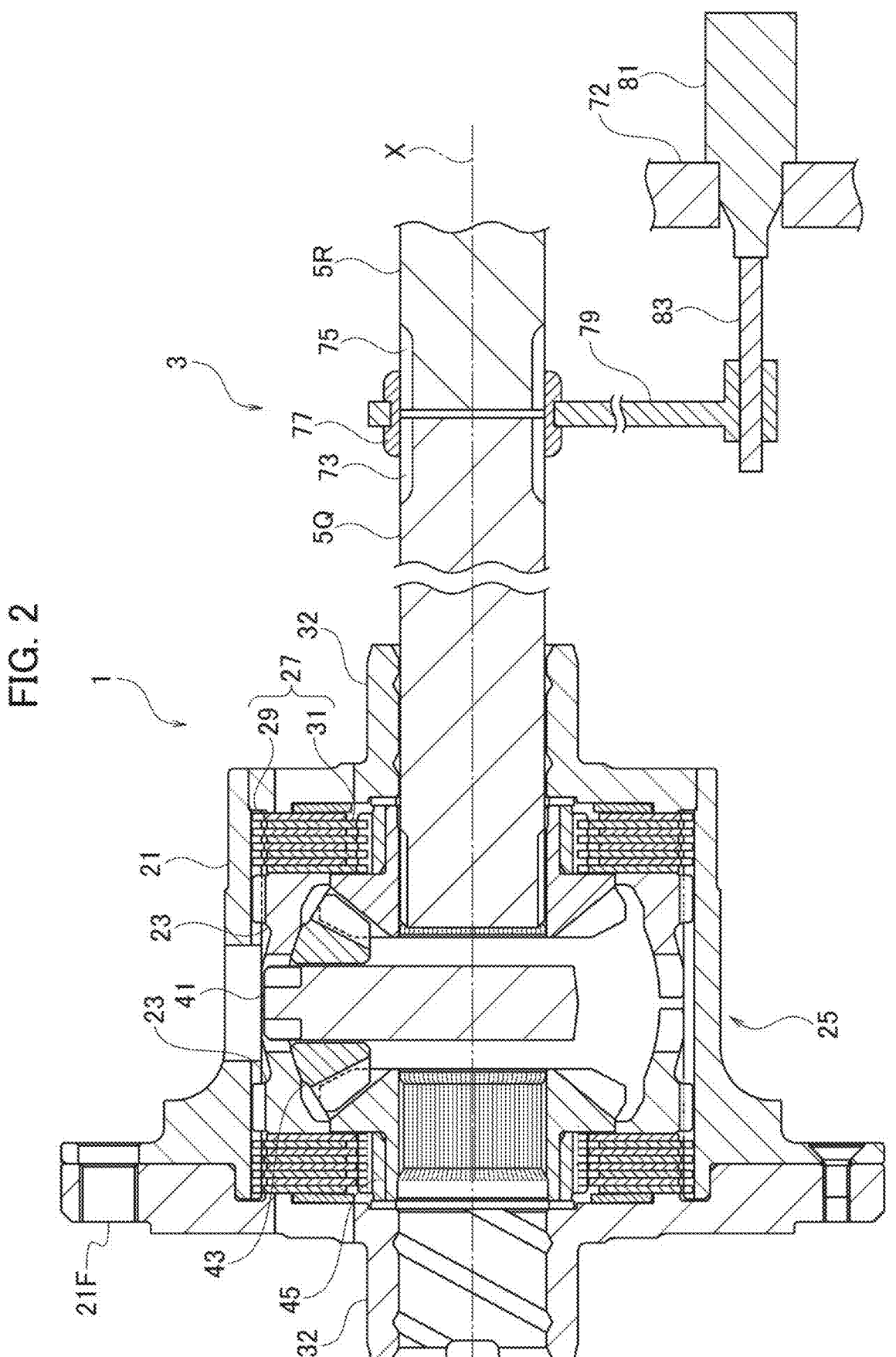
FIG. 2 is a sectional view of a disconnect device and a differential device contained in a power transmission device according to an embodiment.

Referring to FIG. 2 in combination with FIGS. 1A through 1C, the differential device 1 contains a disconnect device 3 for connectably disconnecting one of its output shafts. The differential device 1 and the disconnect device 3 may be housed and supported by a single gear housing 71. Alternatively, the gear housing 71 may be provided with a sub-housing 72 defining a chamber separated from a main chamber, and the disconnect device 3 may be housed and supported by the sub-housing 72. The sub-housing 72 and the gear housing 71 may be formed either in a unitary body or as separate bodies. In a case of the unitary body, the structure is advantageous in weight reduction because any additional structures or any fixation means for combining two or more bodies are not required. In a case of the separate bodies, these bodies may be combined by means of bolts or such. The latter case helpful for embodying an assembly process in which first the differential section and the disconnect section are independently installed therein and thereafter these sections are combined together.

In the differential device 1, an output shaft 5Q is splined-connected to a right side gear 45 for example, while the right axle 5R is coaxial with and adjacent to the shaft but not steadily connected thereto. End sections of the shaft and the axle are respectively provided with lugs 73, 75, with which a coupling sleeve 77 engages and is axially movable. Only when the coupling sleeve 77 comes to a position where it straddles both the lugs 73, 75, the output shaft 5Q is drivingly coupled to the axle 5R. Or, a dog clutch or any other meshing structure may be used instead of the lugs 73, 75 and alternatively a friction clutch may be used.

For driving the coupling sleeve 77 in the axial direction, a shift fork 79 is available for example. The shift fork 79 at one end slidably engages with the coupling sleeve 77 and is at the other end coupled with a plunger 83. A linear actuator 81 fixed to the gear housing 71 for example causes the plunger 83 to controllably move forward and backward. Alternatively, in place of the combination of the actuator 81 and the plunger 83, any mechanism for converting a rotational motion into a linear motion, such as a combination of a motor and a ball screw, is available. Although not shown in the drawings, any known synchronizer may be interposed between the shafts 5R, 5Q. By operating the actuator or the motor 81, via the shift fork 79, the coupling sleeve 77 moves in the axial direction to connect or disconnect the shafts 5R, 5Q.

Figure 3A:
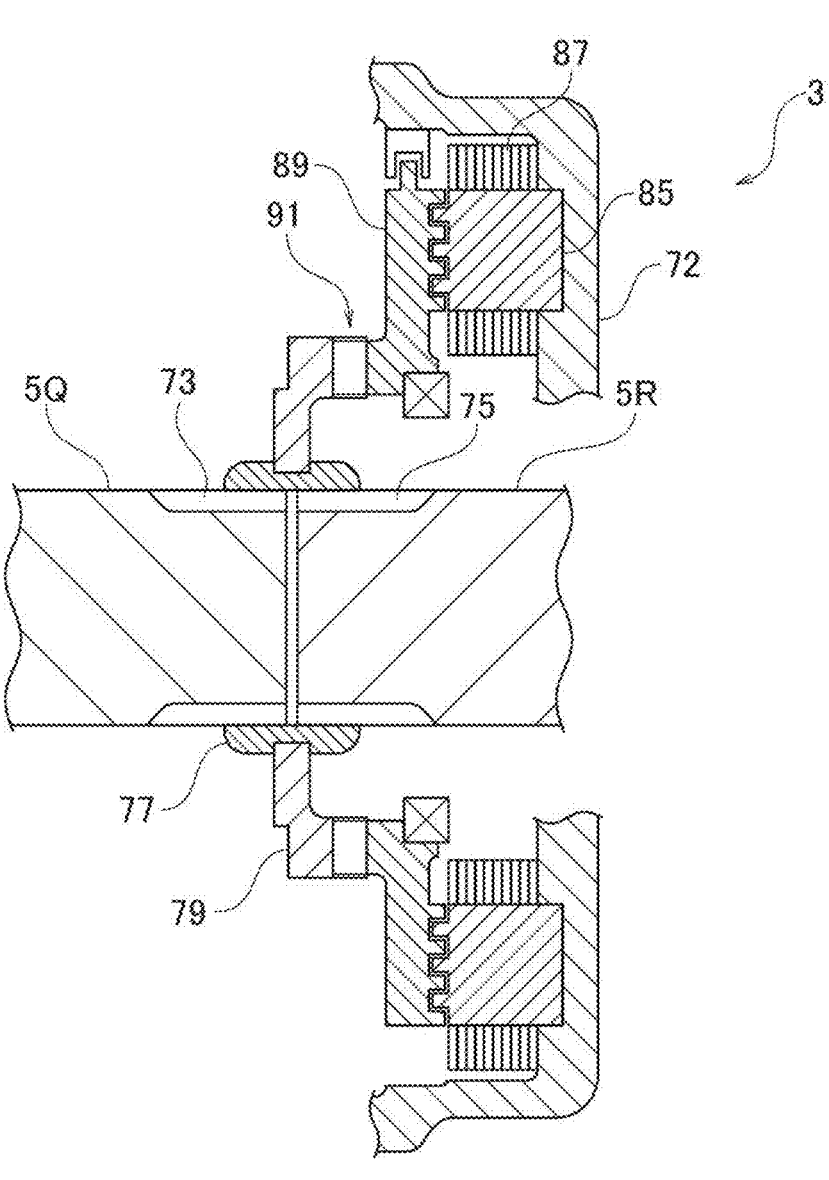
FIG. 3A is a sectional view of a disconnect device according to another embodiment.
Figure 3B:
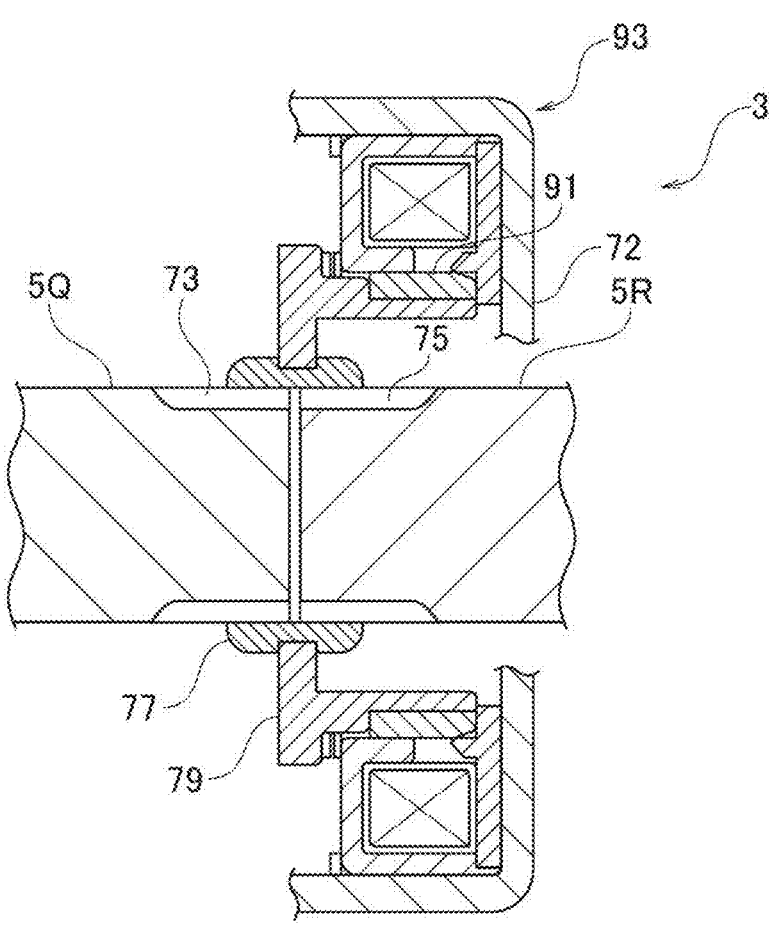
FIG. 3B is a sectional view of a disconnect device according to yet another embodiment.

For operating the disconnect device 3, a coaxial motor as shown in FIG. 3A is available. The coaxial motor is provided with a plurality of cores 85 arranged around the axis X, respectively on which electromagnetic coils 87 are wound for example, and, by means of a magnetic flux generated thereby, rotates a rotor 89 about the axis X and uses a cam mechanism 91 to convert the rotation into an axial motion to drive the ring 79. In between the rotor 89 and the cam mechanism 91, a reduction gear set may be interposed to reduce the speed of the rotation (multiply its torque). The ring 79 slidably engages with the coupling sleeve and thus the coaxial motor can drive the coupling sleeve 77. Alternatively, as shown in FIG. 3B, a solenoid 93 for axially driving the plunger is instead available. The ring 79 which may be formed of a non-magnetic material acts as an intermediary to drive the coupling sleeve 77.

In any case, when the disconnect device 3 drivingly connects the shafts 5R, 5Q, the torque is output via the differential device 1 to the axles 5R, 5L while allowing differential motion. On the other hand, when the shafts 5R, 5Q are disconnected, not only is no torque output to the right axle 5R, but the differential device 1 spins freely and output no torque to the left axle 5L. Further, even when the vehicle is decelerating, no torque flows backward through the differential device 1 to the power source.

The constitution of the disconnect device 3 is not limited to what is described above but various constitution may be possible. For example, the disconnect device 3 may be divided into a part belonging to the shaft 5R and a part belonging to the shaft 5Q. Further, the disconnect device 3 may be housed in a casing 21 and so structured as to disconnect the shaft 5R from one of the side gears. The latter helps to reduce the size of the device totally because related components can be concentrated in the casing 21.

Referring again to FIG. 2, the differential device 1 is in general provided with the casing 21 drivingly coupled to a power source to receive torque and rotate about an axis X, a differential gear set 25 for outputting the torque while allowing differential motion, and a friction clutch 27 for limiting the differential motion. The friction clutch 27 is interposed between the casing 21 and the differential gear set 25 for example, or internal to the differential gear set 25.

The casing 21 is, at both ends for example, provided with boss sections 32, and the gear housing 71 is accordingly provided with bearings 34, thereby the casing 21 is rotatably supported by the gear housing 71. The casing 21, via the ring 9 for example as described already, meshes with the reduction gear set 7 to receive the torque therefrom. For the coupling with the ring gear 9, the casing 21 may be, but not limited to, provided with a flange 21F for example. The outer periphery of the casing 21 may be directly provided with gear teeth, or a separate gear may be welded and thus unitized with the casing 21. Still alternatively, the torque transmission may be by any other transmission means such as a belt.

The casing 21 may directly support the differential gear set 25 but instead a pair of thrust members 23 may be interposed. The thrust members 23 engage with the casing 21 and are thereby capable of transmitting torque. The thrust members 23 have another function of applying thrust force to friction clutches 27 as described later. For the engagement, the casing 21 and the thrust member 23 respectively have lugs and grooves both elongated in the axial direction and mutually engaging, and thereby the thrust member 23 can transmit the torque while being axially movable.

The differential gear set 25 is provided with a plurality of pinion gears 43 rotatably supported by pinion shafts 41, and right and left side gears 45 respectively meshing with the pinion gears 43. When torque is input to the pinion shafts 41, the torque is output via the engagement between the gears to both the side gears 45 while allowing differential motion between the side gears 45. The example in the drawing and the following description mainly relate to a bevel gear type but a face gear type may be available instead of the bevel gear type and any other appropriate type is also available.

The casing 21, by the aforementioned grooves for example, engages with and supports plural outer plates 29. Boss sections of the side gears 45 are respectively provided with lugs for example to engage with plural inner plates 31. The outer plates 29 and the inner plates 31, as being layered alternately, constitute a multi-plate clutch 27 as a friction clutch. Two multi-plate clutches 27 are respectively put between end faces of the casing 21 and the thrust members 23, and frictionally limit the differential motion between the side gears 45 when receiving thrust force from the thrust members 23.

Figure 4:
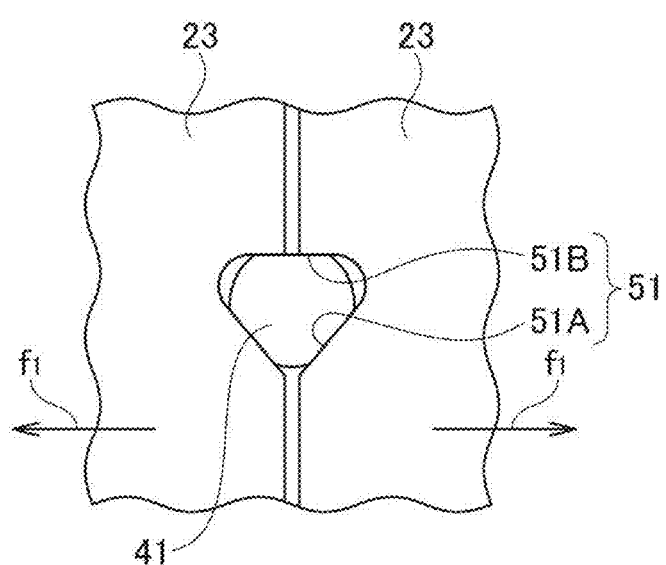
FIG. 4 is a plan view showing a pinion shaft and thrust members mutually abutting.

Referring to FIG. 4 in combination with FIG. 2, the thrust members 23 may be respectively provided with slots 51 for supporting the pinion shafts 41 and support end sections of the pinion shafts 41 by putting the sections between the slots 51. As each slot 51 is not symmetrical, a face thereof abutting against the pinion shaft 41 in a forward direction relative to the differential device 1 is a cam face 51A inclined to the circumferential direction and the other abutting face 51B in the opposite direction is substantially perpendicular to the circumferential direction.

When the torque is applied in a direction of accelerating the rotation (drive direction), as these elements mutually abut at the cam face 51A, part of the torque is converted into a thrust force f1 in the axial direction to press the multi-plate clutches 27, thereby limiting the differential motion by the differential gear set 25. As the applied torque increases, the thrust force increase. Therefore, the differential limitation by the multi-plate clutches 27 is torque-sensitive.

When the torque is applied in a direction of decelerating the rotation (coast direction), the perpendicular face 51B does not create thrust force. Therefore, the differential device 1 according to the present embodiment is a one-way LSD mainly exerting the limiting ability in the accelerating direction. In contrast in the decelerating direction, the torque flows back through the casing 21 to the power source without being consumed. The returned torque can be utilized for energy regeneration.

Figure 5:
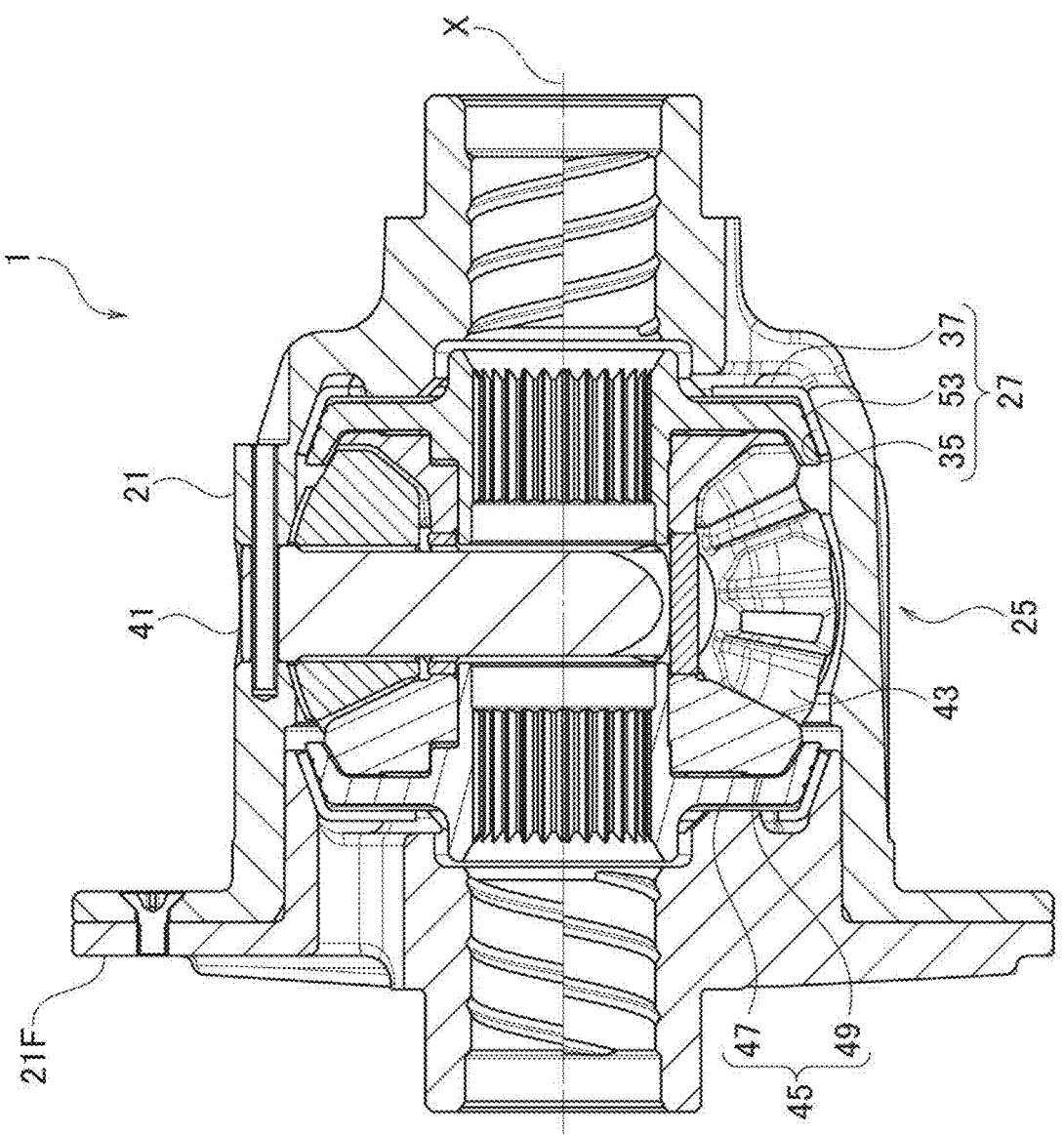
FIG. 5 is a sectional view of a differential device according to another embodiment.

While the above description relates to the example of the multi-plate clutch, the differential limitation may be executed by a cone-clutch as illustrated in FIG. 5. The pinion shafts 41 are coupled with the casing 21 by means of inserted pins and a plurality of pinion gears 43 is rotatably supported by the pinion shafts 41 and meshes with right and left side gears 45.

The combination of an axially outer surface of each side gear 45 and a corresponding inner surface of the casing 21 constitutes a friction clutch 27, which serves to limit differential motion between the side gears 45.

As the meshing reaction force created by the engagement of the gear teeth of the pinion gears 43 and the side gears 45 presses the side gears 45 axially outward, the force activates the friction clutches 27. As the applied torque increase, the thrust force increases. The function of limiting differential motion by the friction clutches 27 is therefore torque-sensitive. To strengthen the effect, the friction surfaces 35 of the casing 21 and the friction surfaces 53 of the side gears 45 may be respectively conical faces (specifically, these members constitute cone clutches) and further friction rings 37 may be interposed between the friction surfaces 35 and 53.

Figure 6:
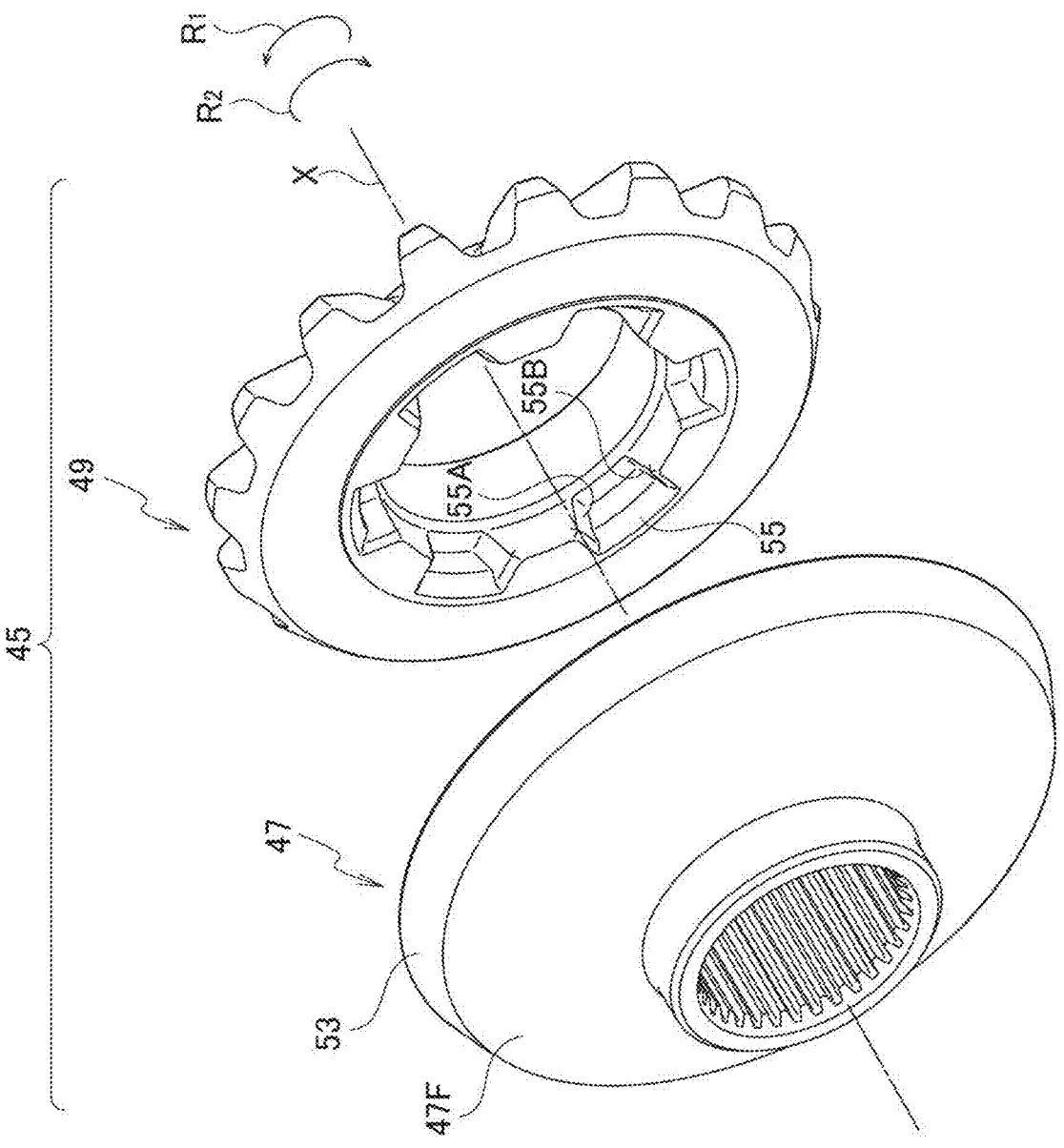
FIG. 6 is an exploded perspective view of a side gear comprised of a gear member and an output member.

Referring to FIG. 6 in combination with FIG. 5, each side gear 45 may not be a unitary body but may be comprised of a gear member 49 for meshing with the pinion gears 43 and an output member 47 engaging and rotating unitarily therewith. The output member 47 may be used for coupling with the axle and is provided with a flange section 47F expanding radially outward to receive the gear member 49. The friction surface 53 may be formed on a radially outer rim of the flange section 47F.

Each gear member 49 has sockets 55 as depressions opened axially outward for engaging with the output member 47 and the output member 47 is provided with lugs corresponding thereto. While the relation between the sockets and the lugs may be reversed, in any case, the engagement structure transmits the torque between the gear member 49 and the output member 47 in both the forward rotation R1 and the reverse rotation R2.

Figure 7:
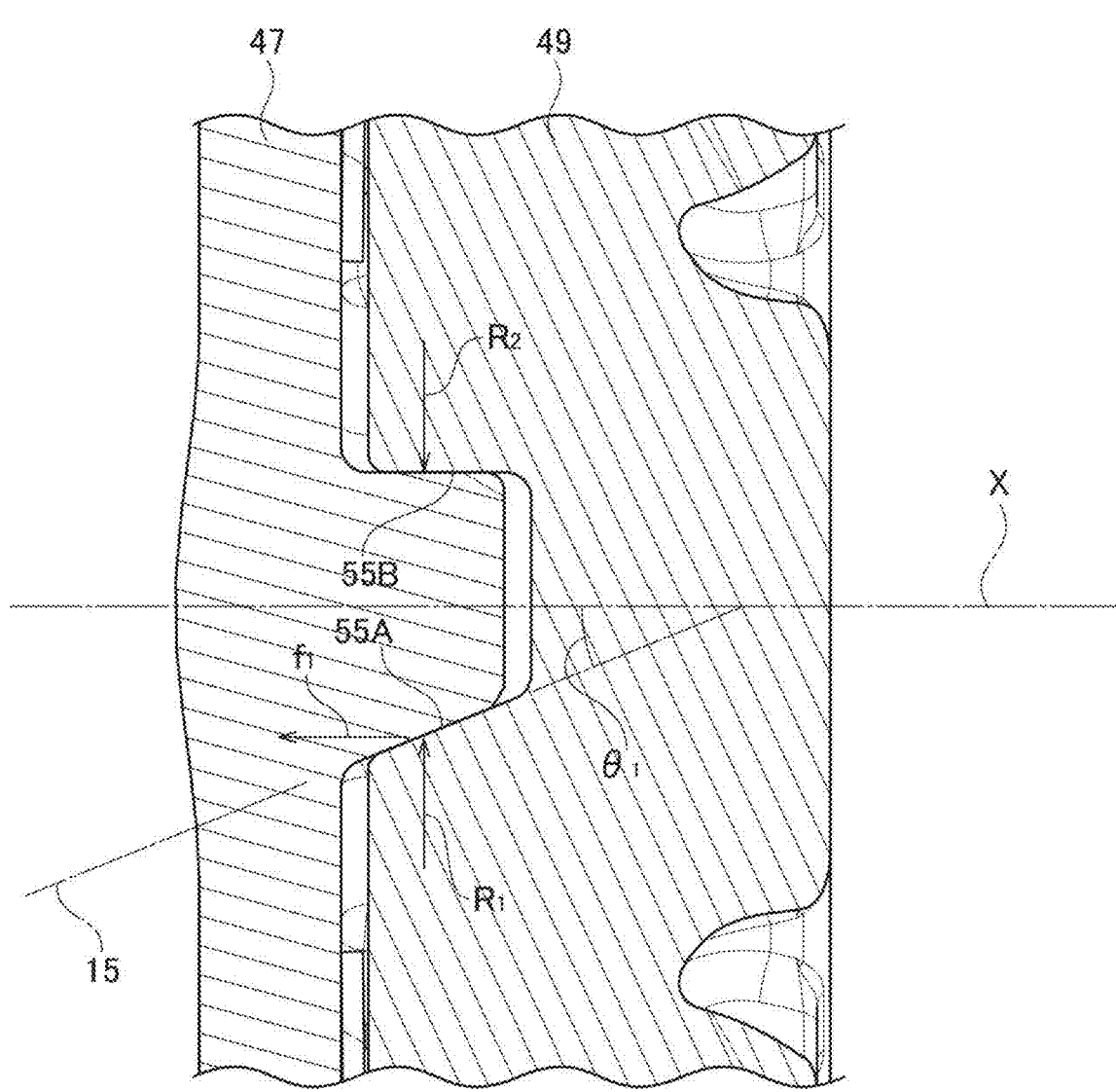
FIG. 7 is a partial sectional view of the side gear for showing engagement at a cam face.

Referring to FIG. 7 in combination with FIGS. 5 and 6, of side faces 55A, 55B of each socket 55, the face 55A abutting in the direction of accelerating the rotation (drive direction) R1 may be inclined relative to the circumferential direction. Needless to say, side faces of each lug may be correspondingly inclined. The inclined side faces abutting against each other function as a cam for converting torque acting on the gear member 49 partly into a thrust force f1. The thrust force f1 presses the output members 47 axially outward to activate the friction clutches 27. While inclination angle θ1 of these faces can be set properly, generally a greater angle creates greater thrust force, thereby generating a greater limiting force on the differential motion.

On the other hand, the opposed side face 55B can be a plane substantially perpendicular to the circumferential direction. When the torque is applied in a direction of decelerating the rotation (coast direction) R2, no thrust force is generated. Therefore, the differential device 1 according to the present embodiment is a one-way LSD mainly exerting the limiting ability in the accelerating direction. In contrast in the decelerating direction, the torque flows back through the casing 21 to the power source without being consumed. The returned torque can be utilized for energy regeneration.

Figure 8:
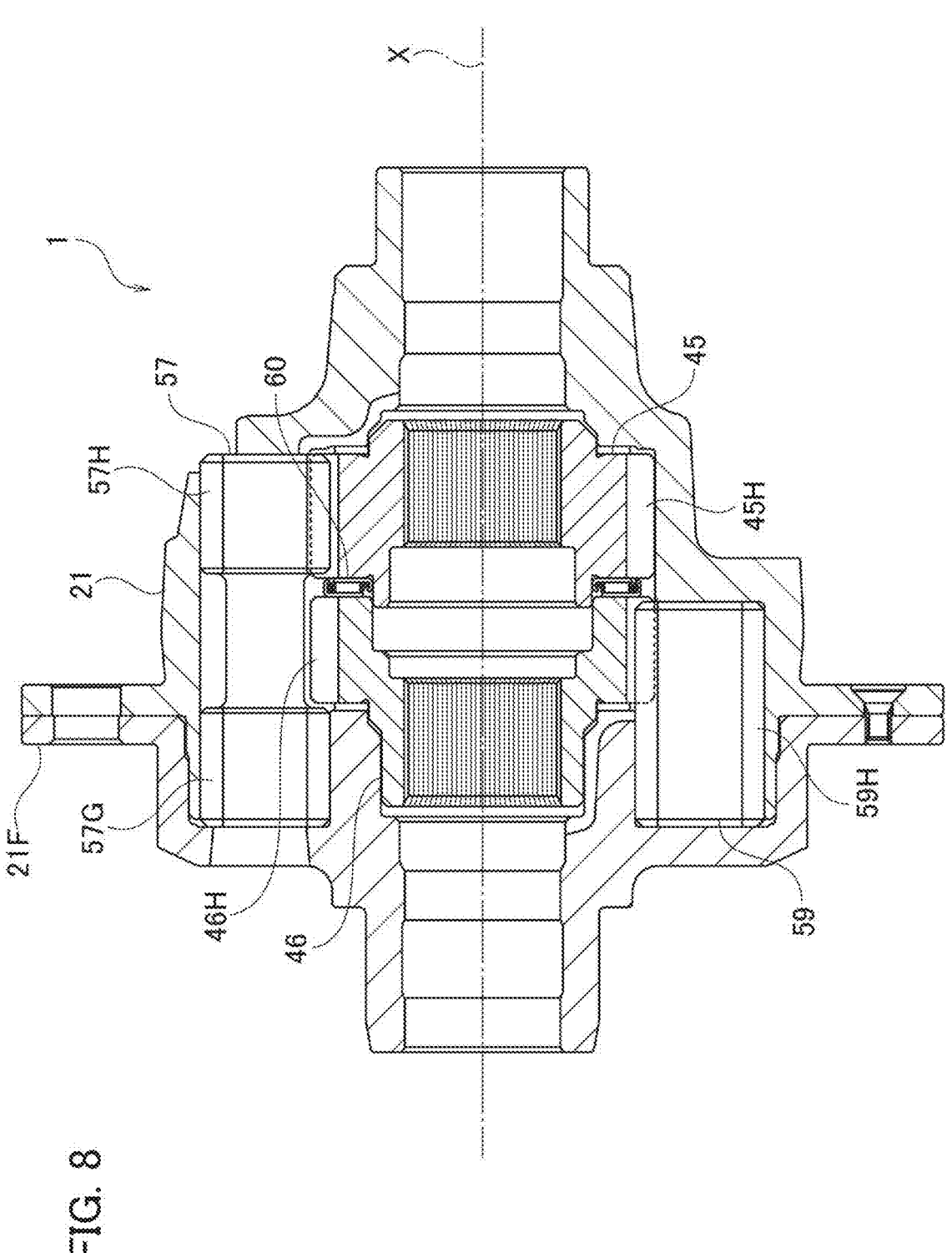
FIG. 8 is a sectional view of a differential device according to yet another embodiment.

Moreover, in place of the multi-plate clutch type or the cone-clutch type, an applicable mechanism is a helical gear type shown in FIG. 8 for example, in which pinions 57, 59 and a pair of side gears 45, 46 are all disposed parallel with the axis. The casing 21 is provided with long bores and short bores, which are both parallel with the axis X and respectively accommodate and rotatably support long pinions 57 and short pinions 59. The pinions 57, 59 are respectively provided with helical gear teeth 57H, 59H and correspondingly the right side gear 45 and the left side gear 46 are respectively provided with helical gear teeth 45H and 46H meshing therewith. The long pinions 57 further provided with helical gear teeth 57G for meshing with the short pinions 59 and thus these pinions are in mesh together. Consequently, differential motion between the side gears 45, 46 are allowed by the intervening pinions 57, 59.

When torque is applied to the casing 21, the torque is differentially distributed via the pinions 57, 59 to the side gears 45, 46. The mutually meshing gear teeth then create thrust force in the axial direction and further the pinion gears 57, 59 supported by end walls of the casing 21 direct the thrust force onto the helical gear teeth 45H, 46H, 57G, 57H and 59H. When the torque is applied in a direction of accelerating the rotation (drive direction), this thrust force increases friction of the side gears 45, 46 against the casing 21, thereby operating the friction clutch 27. Consequently, the differential motion between the side gears 45, 46 is limited. As greater torque application leads to greater thrust force, the differential limitation by the helical gear type is torque-sensitive.

On the other hand, when the torque is applied in a direction of decelerating the rotation (coast direction), the thrust force is generated in the opposite direction. Friction of the side gears 45, 46 against the casing 21 decreases and thus the limiting force prominently decreases. While still there's some friction between the side gears 45, 46, to further reduce the friction, there may be any low-friction member between the side gears 45, 46 and an example thereof is a thrust bearing 60.

The rotation direction may be opposite to that described above. In this case, low-friction members may intervene between the side gears 45, 46 and the casing 21, in place of members between the side gears 45 and 46. Needless to say, the helices on the helical gear teeth 45H, 46H, 57G, 57H and 59H may be properly changed according to the direction of the rotation. More specifically, the direction of the rotation, the directions of the helices and the arrangement of the low-friction members can be properly selected and thereby the limiting forces in the drive direction and the coast direction can be individually increased or decreased.

Still further, the cam structure using the gear member and the output member described with reference to FIGS. 6, 7 can be combined with the helical gear set as described above. The limiting forces in the drive direction and the coast direction can be individually increased or decreased.

The example shown in FIG. 8 can also create greater limiting force in a direction of accelerating the rotation (drive direction) than in a direction of decelerating the rotation (coast direction). The differential device 1 is therefore a semi-one-way LSD exerting greater limiting ability in the accelerating direction. In the decelerating direction, energy consumed by the limiting ability becomes smaller, therefore the reverse torque can be efficiently utilized for energy regeneration.

According to the embodiments described above, because any of the differential devices has a capacity for limiting differential motion, the transmission device therewith can transmit torque to the other even when one driving wheel loses traction. At a time of deceleration on the other hand, while the electric motor regenerates excess energy of the vehicle, then energy loss does not occur or is very small and therefore the system can achieve energy regeneration with a small loss. Further, in a case where energy inflow through the drivetrain is excessive relative to the capacity of the electric motor, the inflow can be cut by operating the disconnect device and the device can therefore prevent excessive load on the electric motor, the regeneration circuit or the rechargeable battery.

Although certain exemplary embodiments are described above, modifications and variations of the embodiments will occur to those skilled in the art, in light of the above teachings.

What is claimed is:

1. A power transmission device for outputting power of a power source to a pair of output shafts with allowing differential rotation, comprising:

a casing drivingly coupled to the power source to create a rotation about an axis;

a differential gear set so supported by the casing as to rotate with the casing about the axis, the differential gear set including a pair of side gears capable of making a differential motion from each other;

a friction section interposed between the casing and the differential gear set, or internal to the differential gear set, to frictionally limit the differential motion;

a disconnect device coupled to one of the output shafts, the disconnect device being configured to connectably disconnect one of the side gears from the one of the output shafts; and a cam structure so coupled directly or indirectly to the friction section as to convert a torque in a direction for accelerating the rotation into a thrust force in an axial direction to exert the thrust force on the friction section, wherein the differential gear set includes a pinion gear so meshed with the side gears as to allow the differential motion, each of the side gears includes a gear member in mesh with the pinion gear and an output member including a friction surface so structured as to directly or indirectly abut against an internal surface of the casing to constitute a friction clutch, and the gear member and the output member engage together at a cam face inclined relative to a circumferential direction so that the cam face creates the thrust force, and wherein the gear member and the output member are so meshed as not to create an axial force in response to the torque in a direction for decelerating the rotation.

2. The power transmission device of claim 1, wherein the differential gear set includes a pinion gear so meshing with the side gears as to allow the differential motion, and a pinion shaft supporting and having the pinion gear rotatable about a pinion axis perpendicular to the axis, and the cam structure includes a thrust member having a cam face abutting against the pinion shaft at an angle to a circumferential direction so as to create the thrust force.

3. The power transmission device of claim 2, wherein the thrust member is in torque-transmitting engagement with the casing and axially movable.

4. The power transmission device of claim 2, wherein the thrust member abuts against the pinion shaft so as not to create an axial force in response to the torque in a direction for decelerating the rotation.

5. The power transmission device of claim 1, wherein the differential gear set includes a pinion so meshed with the side gears as to allow the differential motion, and the pinon and the side gears respectively include helical gear teeth so formed as to create tooth pressure creating the thrust force.

6. The power transmission device of claim 5, wherein a low-friction member is interposed between the pair of side gears or between the side gears and the casing.

\* \* \* \* \*